United States Patent [19]

Brown et al.

[11] 4,207,297
[45] Jun. 10, 1980

[54] PROCESS FOR PRODUCING HIGH PURITY LITHIUM CARBONATE

[75] Inventors: Patrick M. Brown, Exton; Charles E. Falletta, Downingtown, both of, Pa.

[73] Assignee: Foote Mineral Company, Exton, Pa.

[21] Appl. No.: 890,328

[22] Filed: Mar. 27, 1978

[51] Int. Cl.$^2$ .................... C01D 15/08; C01D 15/02
[52] U.S. Cl. ........................ 423/179.5; 423/421; 423/641
[58] Field of Search .................. 423/179.5, 421, 641

[56] References Cited

U.S. PATENT DOCUMENTS

| | | | |
|---|---|---|---|
| 2,413,644 | 12/1946 | Nicholson | 423/179.5 |
| 2,940,820 | 6/1960 | Mazza et al. | 423/179.5 |
| 3,007,771 | 11/1961 | Mazza et al. | 423/179.5 |

FOREIGN PATENT DOCUMENTS 596302  4/1960  Canada ............................. 423/179.5

OTHER PUBLICATIONS

Hader, R. N. et al., Lithium and its Compounds, I and EC, Dec. 1951, pp. 2636-2646, particularly 2642-2643.

Primary Examiner—Delbert E. Gantz
Assistant Examiner—Gary P. Straub
Attorney, Agent, or Firm—Howson and Howson

[57] ABSTRACT

A continuous integrated process for the production of lithium hyroxide monohydrate and high purity lithium carbonate of large average particle size comprising converting impure lithium carbonate to lithium hydroxide by a causticization step, separating precipitated calcium carbonate from the resulting lithium hydroxide solution, precipitating lithium hydroxide monohydrate from a major portion of the lithium hydroxide solution and recovering same, introducing carbon dioxide or lithium carbonate to the remaining minor portion of the lithium hydroxide solution to precipitate additional calcium as calcium carbonate, separating the precipitated calcium carbonate from the lithium hydroxide solution, introducing carbon dioxide to the lithium hydroxide solution to precipitate high purity lithium carbonate of large average particle size, separating and recovering said lithium carbonate from the resulting lithium carbonate solution, and recycling said lithium carbonate solution to said causticization step.

6 Claims, 1 Drawing Figure

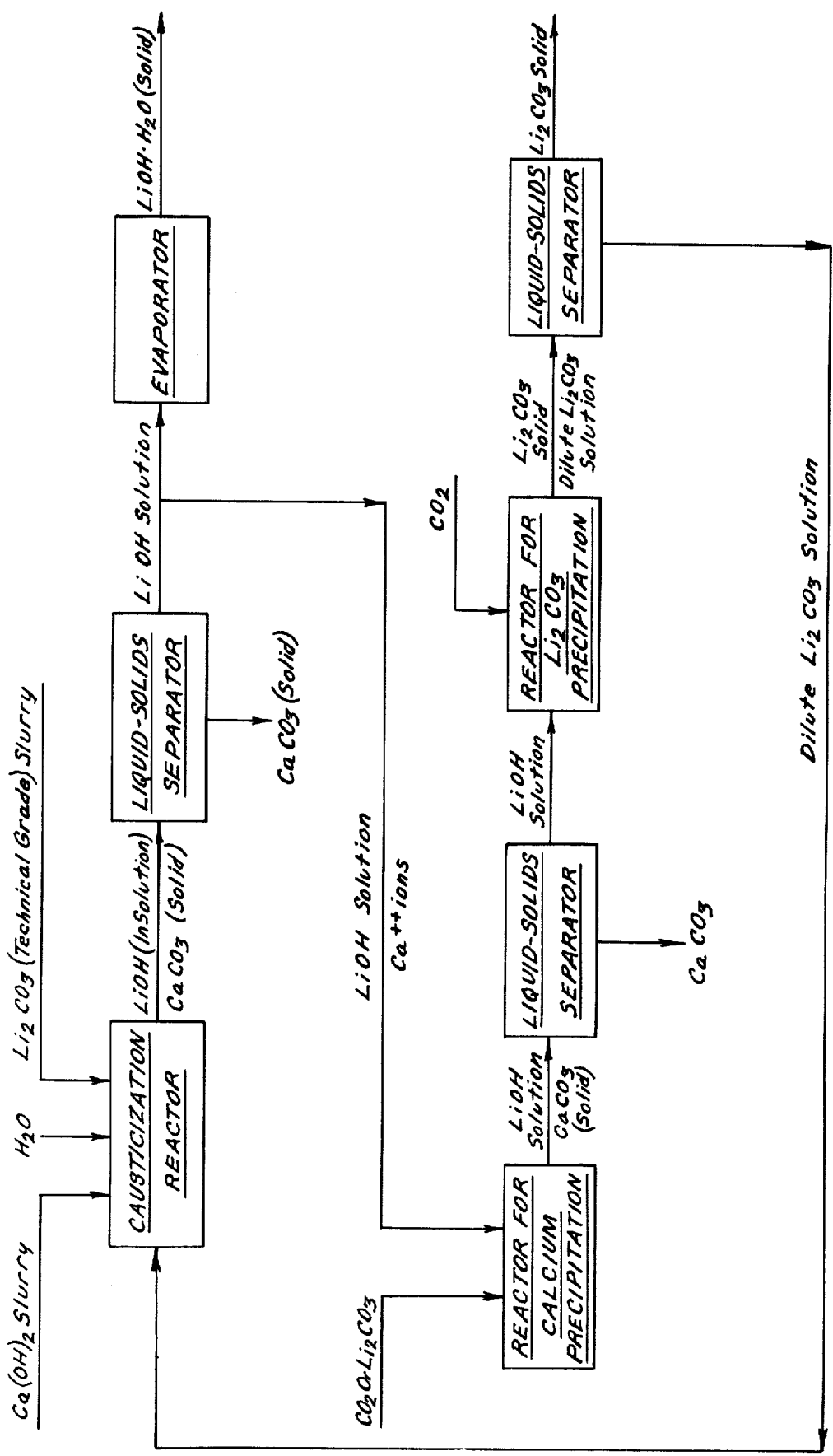

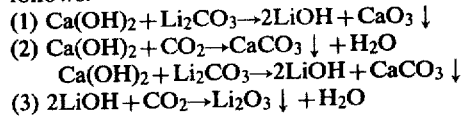

PROCESS FOR PRODUCING HIGH PURITY LITHIUM CARBONATE

BACKGROUND OF THE INVENTION

This invention relates to an economical, continuous, integrated process for preparation of lithium hydroxide monohydrate and high purity lithium carbonate of large average particle size from a relatively impure lithium carbonate feed.

Recent advances in the glass and ceramic industry have created a demand for higher purity raw materials. For example, technical grade lithium carbonate has not proven entirely satisfactory for use in the production of some specialty glass compositions. In addition, in recent years lithium carbonate has begun to be used in the treatment of manic depression. These diverse uses have created a demand for high purity lithium carbonate, which compound should also have a large average particle size to be acceptable for use in the ceramic and glass industries.

By the expressions "high purity" and "large average particle size" as used in this specification and appended claims is meant that the lithium carbonate has a chemical analysis showing a lithium carbonate content of at least 99.3%, and not more than 0.015% calcium, 0.013% sulfate ions, and 0.01% sodium; and that the particle size is such that at least 50% of the particles are plus 140 mesh, respectively. Typically the high purity $Li_2CO_3$ products obtainable by the present invention may contain as little as 0.006% Ca, 0.010% $SO_4$, and 0.002 Na.

It is known that such a lithium carbonate product can be obtained from dilute solutions of lithium hydroxide through precipitation with carbon dioxide. However, the production of lithium carbonate using such dilute solutions has been found to be uneconomical since the yield is only about 65%. In addition, if the lithium carbonate is produced by reacting carbon dioxide with a solution formed from highly pure lithium hydroxide, the use of this relatively expensive starting material inordinately increases process costs.

SUMMARY OF THE INVENTION

According to the continuous integrated process of this invention, high purity lithium carbonate having a large average particle size can be produced economically from a relatively inexpensive starting material; namely, technical grade lithium carbonate. Although the process involves the use of dilute solutions of lithium hydroxide, losses of lithium values are minimized by recycling the spent liquor from which the high purity lithium carbonate has been recovered. Buildup of impurities within the process is minimized and controlled by conversion of only a portion of the available lithium values to lithium carbonate, a significant portion being recovered as lithium hydroxide monohydrate, and the impurities largely being removed during recovery of lithium hydroxide monohydrate.

The process comprises three essential reaction steps; namely, causticization of an aqueous solution of impure lithium carbonate to produce lithium hydroxide with precipitation of calcium carbonate, treatment of the supernatant lithium hydroxide solution after removal of calcium carbonate with carbon dioxide or lithium carbonate to effect a reduction in concentration of calcium ions, and production of high purity lithium carbonate by treatment of the lithium hydroxide solution of reduced calcium ion content with carbon dioxide. The chemical reactions involved are well known and are as follows:

(1) $Ca(OH)_2 + Li_2CO_3 \rightarrow 2LiOH + CaO_3 \downarrow$
(2) $Ca(OH)_2 + CO_2 \rightarrow CaCO_3 \downarrow + H_2O$
  $Ca(OH)_2 + Li_2CO_3 \rightarrow 2LiOH + CaCO_3 \downarrow$
(3) $2LiOH + CO_2 \rightarrow Li_2O_3 \downarrow + H_2O$

BRIEF DESCRIPTION OF ACCOMPANYING DRAWING

The accompanying drawing shows an illustrative flow sheet of the process of the present invention.

DETAILED DESCRIPTION OF THE SPECIFIC EMBODIMENTS

In accordance with the present invention there is provided an improved integrated process for production of lithium hydroxide monohydrate and high purity lithium carbonate of large average particle size.

One embodiment of the process is depicted in the accompanying flow diagram. A slurry of calcium hydroxide and a slurry of lithium carbonate are continuously fed to a first causticization reactor. Water may also be introduced to the first reactor as required to replace that removed from the integrated system particularly in the lithium hydroxide monohydrate recovery step described hereinbelow. Advantageously, the lithium carbonate can be of impure relatively inexpensive technical grade since an important feature of the integrated process is the reduction in concentration of such impurities as calcium and sulfate ions to tolerable levels. Technical grade lithium carbonate contains a minimum of about 99% lithium carbonate and may contain as much as 0.05% calcium and 0.4% sulfate ions.

As noted above, in the first reactor lithium carbonate is converted to lithium hydroxide and calcium carbonate is precipitated. A stream of lithium hydroxide solution having suspended therein solid particles of substantially insoluble calcium carbonate is continuously withdrawn from the first reactor. The lithium hydroxide concentration of this stream generally will be on the order of from about 1 to about 3%, and will contain up to 30 ppm soluble calcium.

The lithium hydroxide stream from the first reactor is continuously introduced to a first liquid-solids separator in which the precipitated calcium carbonate is separated from the lithium hydroxide solution. This separator may take the form of a filter, thickener, or centrifuge. The lithium hydroxide solution from the first reactor is separated as a supernatant solution containing on the order of 2% lithium hydroxide. Water may be used to wash the precipitated calcium carbonate to effect recovery of soluble lithium values.

The supernatant lithium hydroxide solution continuously withdrawn from the first liquid-solids separator is divided into two streams, that comprising the major portion of the solution being directed to an evaporator where, through fractional crystallization, high quality lithium hydroxide monohydrate product is obtained. By "major portion" is meant that the stream used for recovery of lithium hydroxide monohydrate has a volume ratio to that of the other stream used for production of lithium carbonate of from about 10:1 to about 2:1. Preferably, the ration of the major to that of the minor stream of supernatant lithium hydroxide solution is about 4:1 or greater.

The solution from which the lithium hydroxide monohydrate has been separated contains the majority of impurities. This stream can be bled as is, or further concentrated with recycle of the LiOH.H₂O prior to bleeding of this stream. Maximizing the impurities in this stream while minimizing the lithium concentration has a beneficial effect on process yield.

The minor stream of supernatant lithium hydroxide solution from the first liquid-solids separator is continuously introduced to a second reactor in which the solution is treated with carbon dioxide or lithium carbonate to effect a further reduction in the concentration of calcium ions. The amount of either reactant for such purpose should be sufficient to cause precipitation of the major portion of the calcium ions as substantially insoluble calcium carbonate without any significant precipitation of more soluble lithium carbonate. In order to achieve this result the calcium ion concentration of the solution of lithium hydroxide from the first liquid-solids separator should be determined and the amount of either carbon dioxide or lithium carbonate reactant should not exceed about 300% of the stoichiometric quantity required for theoretical precipitation of all calcium ions.

Lithium hydroxide solution is continuously withdrawn from the second reactor and passed to a second liquid-solids separator which may comprise a filter or other well known means for separating solids from a liquid. Prior to entering the second liquid-solids separator, the lithium hydroxide solution preferably is heated to temperatures on the order of about 130° to about 195° F. to enhance precipitation of calcium carbonate. Inasmuch as the calcium carbonate precipitate may contain a significant amount of lithium values, the filter cake from the second liquid-solids separator may be returned to the first reactor in order to minimize lithium losses.

The supernatant lithium hydroxide solution is continuously withdrawn from the second liquid-solids separator and introduced to a third reactor, whereby lithium hydroxide is converted to lithium carbonate. The concentration of lithium hydroxide in the solution introduced to the third reactor will ordinarily be on the order of from about 1 to about 3%. The temperature of the lithium hydroxide in the third reactor should be on the order of about 70° to about 195° F., and the molar ratio of carbon dioxide employed to react with available lithium hydroxide is in the range of about 1.0:1 to about 1.01:1 in order to insure satisfactory yield of lithium carbonate product. Preferably the third reactor is provided with means for agitating the reactant solution to enhance liquid-gas contact.

Lithium carbonate solution containing precipitated lithium carbonate is continuously withdrawn from the third reactor and passed to a third liquid-solids separator where high purity lithium carbonate of large average particle size is recovered. Since the supernatant dilute lithium carbonate solution from the third liquid-solids separator contains valuable lithium values, e.g. about 0.8% Li₂CO₃, it is recycled to the first reactor where lithium carbonate is converted to lithium hydroxide in the causticization step.

Inasmuch as the process of this invention involves the use of relatively dilute solutions, to be economical, certain materials must be recycled, particularly the supernatant lithium carbonate solution from the lithium carbonate recovery step.

Of particular importance to the success of the process of this invention is the prevention of buildup of impurities in the system by continuous removal of the major portion thereof in production of lithium hydroxide monohydrate. Thus, preferably only about one-fifth of the lithium hydroxide solution from the first liquid-solids separator is used for production of lithium carbonate.

By means of the present process yields of high purity lithium carbonate in excess of 65% are obtainable. Although such yields do not appear to be relatively high per se, nevertheless, it should be understood that the stated yield value is for a single pass, and that the major portion of the lithium values not recovered in the single pass are not lost, but are recycled back into the overall process, resulting in yields in excess of 90%.

The invention is further illustrated by the following examples:

COMPARATIVE EXAMPLE

This example shows the type of lithium carbonate product produced by treating a relatively concentrated solution of lithium hydroxide with carbon dioxide.

A 3,000 gram sample of a 10% LiOH solution having the chemical composition set forth in Table I, below, was treated with $CO_2$ at ambient temperature until a pH of 10.0 was attained, and then heated to 90° C. over a 3 hour period. The product was centrifuged, reslurried with a 3:1 wash, and dried. 400.8 grams product was obtained for a yield of 86.5%. The packed bulk density of the product was 43 lbs/ft³. Physical and chemical characteristics of the product are shown in Table II below:

TABLE I

| Starting LiOH Solution | |
| --- | --- |
| Na | .0067% |
| K | .0010% |
| Cl | .0008% |
| SO₄ | .0026% |

TABLE II

| Analytical Results | |
| --- | --- |
| Na | .0020% |
| K | .0015% |
| Cl | .0008% |
| SO₄ | .0177% |

| Screen Analysis | |
| --- | --- |
| Fraction | Wt. % |
| +40 | 1.7 |
| +100 | 5.0 |
| +140 | 15.2 |
| +200 | 32.1 |
| +325 | 83.5 |
| −325 | 12.5 |

As can be seen by reference to the screen analysis, Table II, only 21.9% of the product comprises +140 mesh material.

EXAMPLE 1

1.5 grams lithium carbonate was added to 1,000 grams of a 1.8% LiOH solution at ambient temperature. The solution was heated to 80° C. and filtered. Then $CO_2$ was added until a $pH \leq 10.0$ was attained. Analysis of the product was 66 ppm calcium as compared to 0.1% Ca for overflow not treated with lithium carbonate or $CO_2$.

EXAMPLE 2

27,646 grams of a 1.8% LiOH solution, pretreated for calcium removal as in Example 1, was saturated at ambient temperature with $CO_2$ and then heated to 80° C. and filtered. 460 grams $CO_2$ were added to the hot filtrate until the pH dropped to 10.2. The resultant slurry was filtered producing 27,059 grams filtrate and 856 grams lithium carbonate (519 grams dry basis). The cake was washed with 1,740 grams hot, deionized water and then dried. The product weighed 512 grams. Overall yield was 64.6% with 100.8% recovery. Physical and chemical properties of the product are summarized in Table III below:

TABLE III

| | Chemical Analysis Starting LiOH Solution | Product | Screen Analysis of $Li_2CO_3$ Product | |
|---|---|---|---|---|
| Na | .0052% | .0005% | +30 | 1.4% |
| K | .0031% | .0001% | −30, +100 | 80.9% |
| Cl | .0008% | .0008% | −100, +140 | 12.3% |
| $SO_4$ | .0069% | .0100% | −140, +200 | 2.8% |
| B | .0017% | .0026% | −200, +325 | 0.7% |
| Ca | — | .0056% | −325 | 1.9% |

Examples 1 and 2 above show the advantageous results in the calcium reduction and lithium carbonate production steps of the process of this invention using a dilute LiOH solution. It will be noted the product is of very high purity and that in excess of 94% by weight of the product has a particle size of +140 mesh which is to be contrasted with only 21.9% of particles of such larger size produced from a concentrated LiOH solution as shown by the Comparative Example.

In summary, an important feature of the process of this invention is the ability to produce economically large particle size lithium carbonate using a dilute lithium hydroxide solution. This is made possible by concurrent production of lithium hydroxide monohydrate with simultaneous removal of impurities to prevent buildup in the overall system, and use of technical grade lithium carbonate as a starting material.

What is claimed is:

1. A continuous integrated process for the production of lithium hydroxide monhydrate and high purity lithium carbonate of large average particle size comprising:
   (A) converting a continuous feed of impure lithium carbonate to lithium hydroxide in a first reactor by a process comprising:
      (1) passing a continuous feed of impure lithium carbonate slurry into said first reactor;
      (2) introducing a slurry of calcium hydroxide to said first reactor, whereby lithium carbonate is converted to lithium hydroxide with simultaneous production of calcium carbonate;
      (3) continuously withdrawing from said first reactor an aqueous reaction product containing from about 1 to about 3 percent, by weight, of lithium hydroxide containing calcium carbonate and a dilute concentration of soluble calcium ions;
   (B) continuously introducing said lithium hydroxide-containing reaction product from said first reactor to a first liquid-solids separator to separate calcium carbonate from said lithium hydroxide-containing reaction product and recovering a lithium hydroxide solution;
   (C) continuously withdrawing said lithium hydroxide solution from said first liquid-solids separator and dividing said solution into first and second streams, the volume ratio of said first to that of said second stream being from about 10:1 to about 2:1;
   (D) continuously introducing said first stream to an evaporator to precipitate lithium hydroxide monohydrate and recovering said lithium hydroxide monohydrate;
   (E) further reducing the calcium ion concentration of said second lithium hydroxide stream by a process comprising:
      (1) continuously introducing said second lithium hydroxide stream to a second reactor;
      (2) Maintaining said second lithium hydroxide stream in said second reactor at ambient temperature, and introducing to said second reactor carbon dioxide or lithium carbonate in an amount sufficient to precipitate the major portion of said calcium ions as calcium carbonate without precipitation of lithium carbonate;
      (3) continuously withdrawing from said second reactor a solution of lithium hydroxide containing calcium carbonate in suspension;
      (4) heating said solution of lithium hydroxide from said second reactor to a temperature of from about 130° to about 195° F.;
   (F) continuously introducing said heated lithium hydroxide solution from said second reactor to a second liquid-solids separator to separate said calcium carbonate from said lithium hydroxide solution;
   (G) converting the major portion of a continuous feed of lithium hydroxide solution from said second liquid-solids separator to solid lithium carbonate product, in which at least about 50 percent, by weight, of the particles are retained on a 140 mesh sieve, and said particles have a lithium carbonate content of at least 99.3 percent, by a process comprising:
      (1) passing a continuous feed of lithium hydroxide solution from said second liquid-solids separator to a third reactor;
      (2) introducing carbon dioxide to said third reactor in an amount to convert the major portion of said lithium hydroxide to solid lithium carbonate of high purity and large average particle size;
      (3) continuously withdrawing from said third reactor a dilute solution of lithium carbonate containing solid lithium carbonate;
   (H) continuously introducing said dilute lithium carbonate solution from said third reactor to a third liquid-solids separator to separate solid lithium carbonate; and
   (I) continuously recycling said dilute lithium carbonate solution from said third liquid-solids separator to said first reactor.

2. The process according to claim 1 in which the solution from step (F) introduced to the third reactor in accordance with step (G) (1) contains from 1 to 3% lithium hydroxide and said solution in said third reactor is maintained at a temperature of from about 70° to about 195° F. during introduction of carbon dioxide.

3. The process according to claim 2 in which the volume ratio of the first to that of the second stream withdrawn from said first liquid solids separator of step B is at least about 4:1.

4. The process according to claim 3 in which the volume ratio of carbon dioxide employed to react with available lithium hydroxide in said third reactor according to step (G) (2) is in the range of from about 1:1 to about 1.01:1.

5. The process according to claim 1 in which the amount of carbon dioxide or lithium carbonate introduced to said second reactor according to step (E) (2) does not exceed about 300% of the stoichiometric quantity required for theoretical precipitation of all calcium ions.

6. The process according to claim 1 in which at least about 65% of the lithium hydroxide in the third reactor in step (G) (2) is converted to solid lithium carbonate.

* * * * *